Feb. 19, 1924.
W. S. HAIMES
COMPUTING DEVICE
Filed Jan. 22, 1923
1,484,176
4 Sheets-Sheet 3
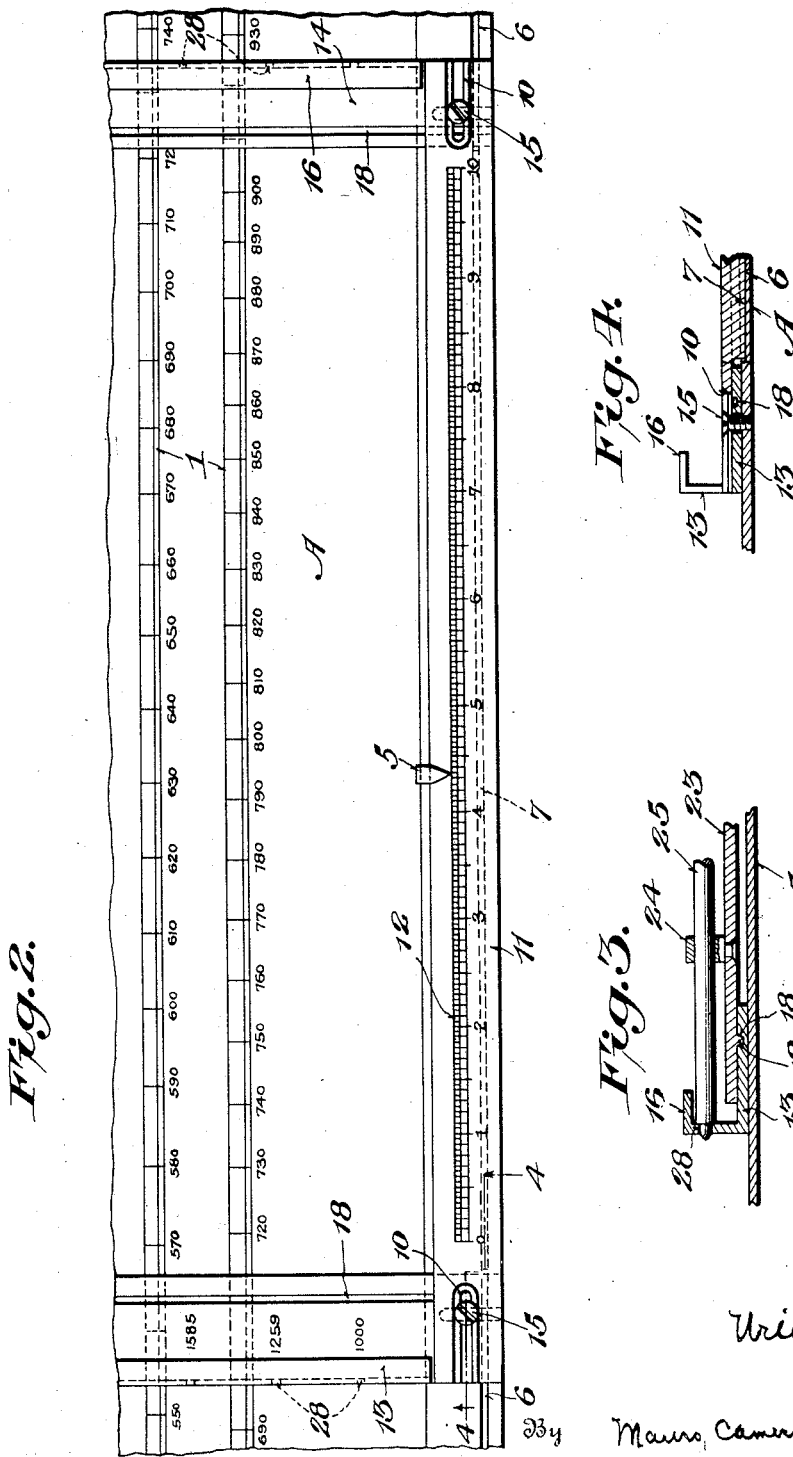

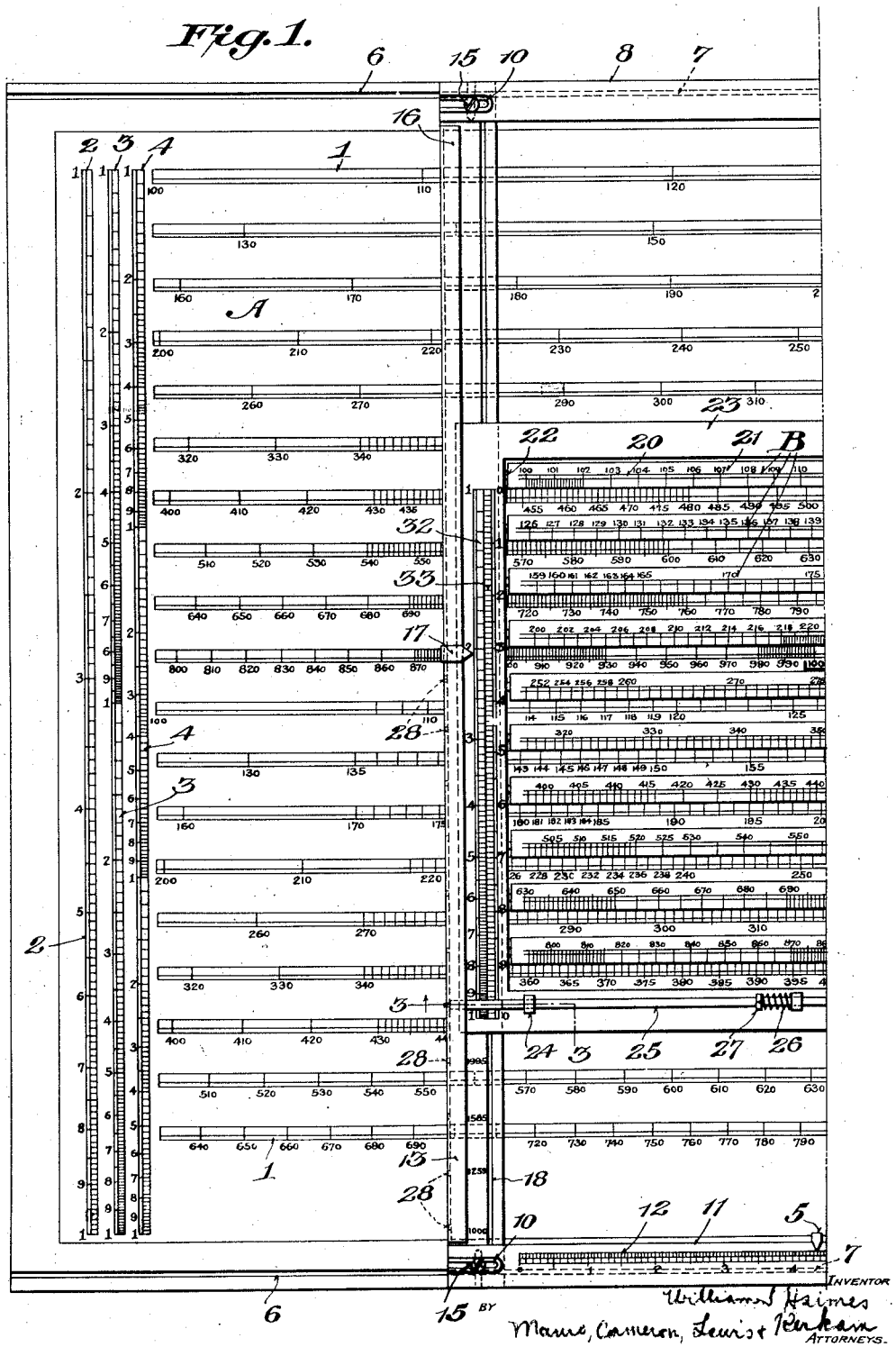

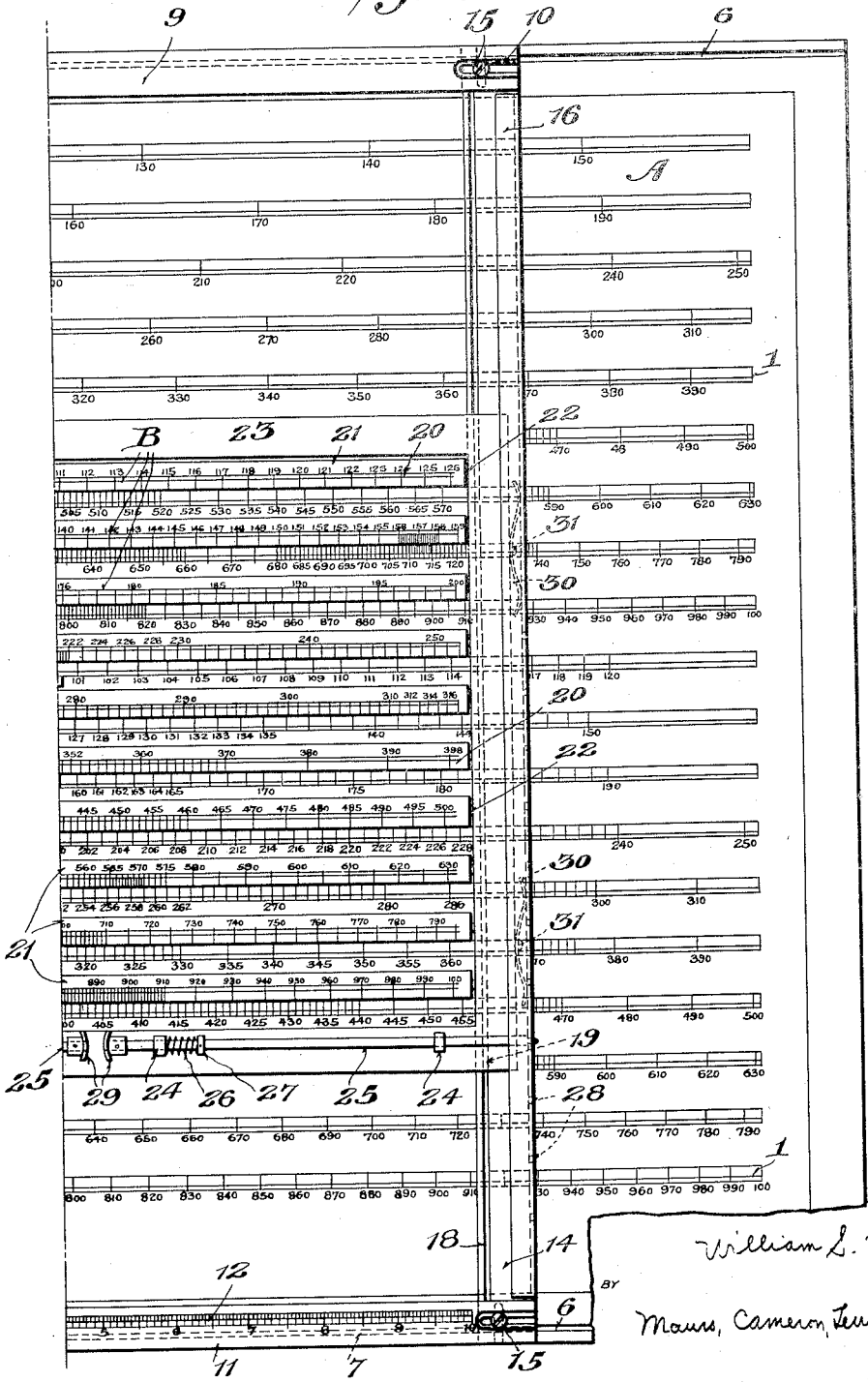

Feb. 19, 1924.

W. S. HAIMES

COMPUTING DEVICE

Filed Jan. 22, 1923

Patented Feb. 19, 1924.

1,484,176

UNITED STATES PATENT OFFICE.

WILLIAM S. HAIMES, OF WASHINGTON, DISTRICT OF COLUMBIA.

COMPUTING DEVICE.

Application filed January 22, 1923. Serial No. 614,275.

*To all whom it may concern:*

Be it known that I, WILLIAM S. HAIMES, a subject of the King of Great Britain, and a resident of Washington, District of Columbia, have invented new and useful Improvements in Computing Devices, which invention is fully set forth in the following specification.

This invention relates to computing devices, for performing mathematical calculations, based on the principle of the side rule.

Rectilinear slide rules of the type now in use are usually made in lengths of from five to twenty inches, the scales being unbroken, and the number of figures which can be read, together with the accuracy of the reading, vary in accordance with the scale length. The range of readings that can be secured on such a rule is comparatively limited because of the fact that, when the rule is increased beyond twenty inches in length, manipulation of the same becomes extremely cumbersome. It has heretofore been proposed to make such rules cylindrical in form to provide scales of greater length. Such an arrangement, while furnishing a longer scale in a more compact space, is unsatisfactory since only a small portion of the scales of this type of rule is visible to the operative at any one setting and much time is lost in revolving the cylinder to secure a series of readings.

It has further been proposed, heretofore, to provide a computing device comprising two cooperating scale sheets each having scales extending over one cycle of logarithms and adapted to slide one over the other, the upper of said sheets being slotted to make visible the indicating numerals upon the scale sheet over which it is slid. This arrangement is unsatisfactory in that a full range of readings, that is one throughout a complete cycle of logarithmic values is not possible from one setting of the device. Moreover, it is extremely difficult to maintain said sheets in correct alinement, thus making it practically impossible to rapidly obtain accurate readings.

An object of this invention is to provide a computing device, or "calculaplane," having scales of unusually long lengths and one in which scale readings extending over a complete cycle of logarithms at one setting are within view of the operative, thereby furnishing a complete range of readings from one setting, and facilitating the location of points for setting and readings.

A further object of this invention is to provide, in combination with the scale members of my improved computing device, or calculaplane, means for accurately obtaining the mantissa part of the logarithm of numbers on one of said members without the necessity for resorting to log-tables.

Other objects of this invention are to provide a computing device or calculaplane, whose scales are contained in such an area that they are compact and easy to read, one in which the settings may be readily and quickly made with extreme accuracy, and one in which the parts, when set for a series of readings, will remain in such position until moved by the operative.

The invention will be more clearly understood by reference to the accompanying drawings, illustrating one embodiment of the inventive idea, in which Fig. 1 is a top plan view of the left half of my calculating device or calculaplane;

Fig. 1ᵃ is a similar view of the right half of one embodiment of the invention;

Fig. 2 is a detail plan view of a scale of equal parts forming a part of the present invention;

Fig. 3 is a detail sectional view, taken on line 3—3 of Fig. 1, illustrating one manner in which the upper scale member may be associated with the lower scale member;

Fig. 4 is a detail sectional view, taken on the line 4—4 of Fig. 2, illustrating one manner in which a frame for the upper scale member may be adjustably constructed.

Figure 5:
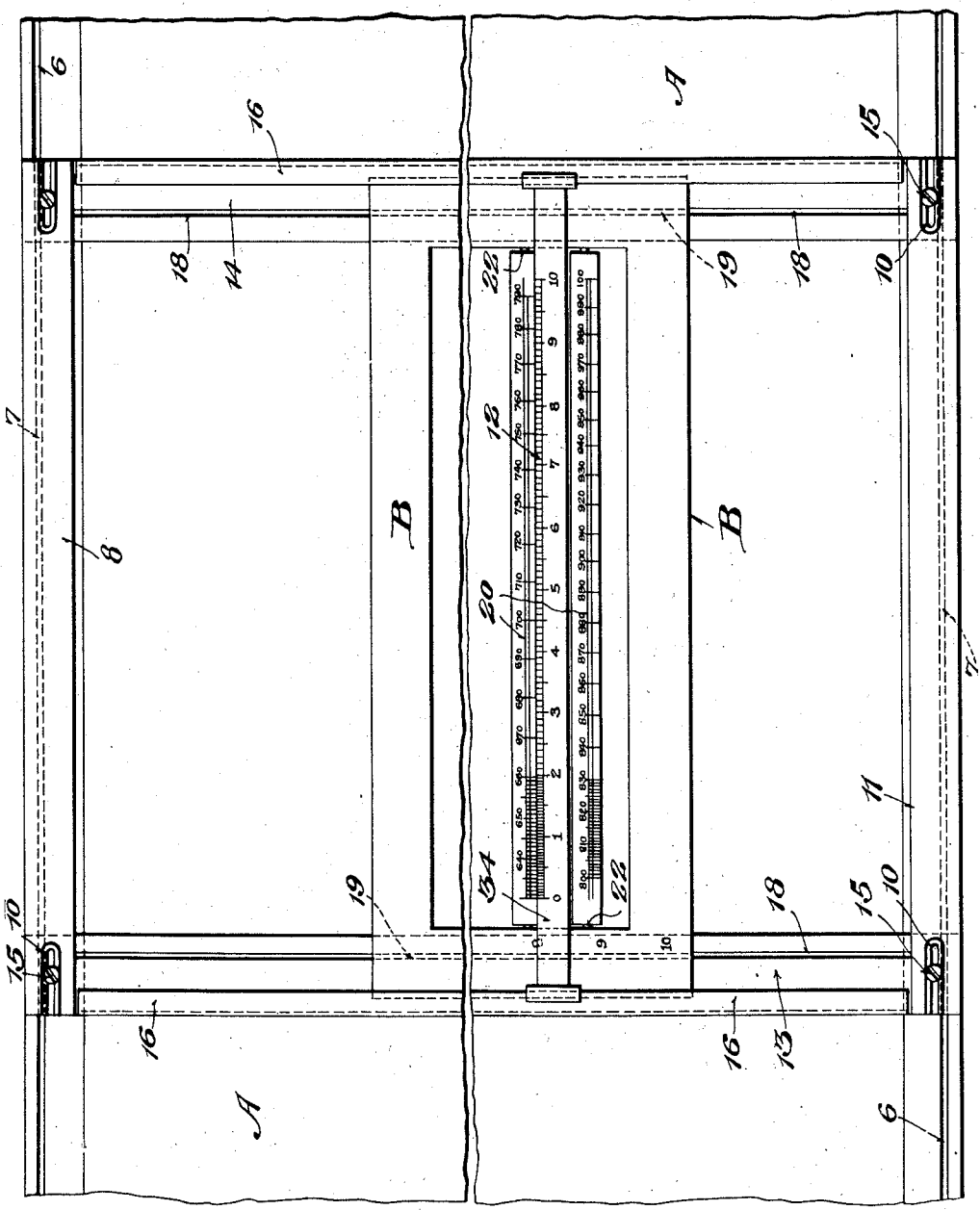
Fig. 5 is a top plan view illustrating one manner in which a scale of equal parts may be associated with the scale members, portions of the latter being broken away.

In the form shown in the drawings, in which like reference numerals refer to like parts throughout the several views, A is a flat scale member of any desired size and formed of any suitable material, as for example metal, celluloid, lithoboard, or paper, and, if desired, may be mounted on a base of wood or other material. In the illustrated embodiment, scale member A is unmounted. Formed on the upper surface of member A in any suitable manner is a plurality of horizontally disposed parallel scale sections which are divided logarithmically (i. e., the scale values assigned to distances along said scale sections are not proportional to the numbers shown on them but are proportional to the logarithms of these numbers) and which extend over approximately four cycles of logarithms as follows:—

| Scale Values. | Scale Values. | Scale Values. |
|---|---|---|
| | Omitted as unnecessary | |
| | 1 | 1.259 |
| 1 | 1.259 | 1.585 |
| 1.259 | 1.585 | 1.995 |
| 1.585 | 1.995 | 2.512 |
| 1.995 | 2.512 | 3.162 |
| 2.512 | 3.162 | 3.981 |
| 3.162 | 3.981 | 5.012 |
| 3.981 | 5.012 | 6.310 |
| 5.012 | 6.310 | 7.943 |
| 6.310 | 7.943 | 1 |
| 7.943 | 1 | 1.259 |
| 1 | 1.259 | 1.585 |
| 1.259 | 1.585 | 1.995 |
| 1.585 | 1.995 | 2.512 |
| 1.995 | 2.512 | 3.162 |
| 2.512 | 3.162 | 3.981 |
| 3.162 | 3.981 | 5.012 |
| 3.981 | 5.012 | 6.310 |
| 5.012 | 6.310 | 7.943 |
| 6.310 | 7.943 | 1 |
| | Omitted as unnecessary | |
| 7.943 | 1 | |

(Cycles labeled CYCLE 1, CYCLE 2, CYCLE 3, CYCLE 4 appear between the columns.)

Since, as shown in the foregoing table, a section of one logarithmical cycle connects with a section of another logarithmical cycle so as to form one continuous line of two single scale sections, said scale sections on scale member A will be hereinafter referred to as double sections 1. As each point marked on the scales of the calculaplane overcomes the necessity of estimating values of distances by measurement with the eye, it is desirable that the scales should have as many points marked off on them as possible, but a density of markings such as would cause confusion in reading should be avoided.

Arranged adjacent the left hand end of scale member A are three vertical scales 2, 3, 4 which may be designated as follows—a one-log scale 2, a two-log or finder scale 3, and a three-log scale 4. Readings from scale 2 to scale 3, and vice versa, furnish the square and square roots of numbers, while readings from scale 2 to scale 4, and vice versa, furnish the cube and cube roots of numbers thereon. If desired, scales 2, 3 and 4 may be horizontally arranged parallel with and immediately below the lowermost double-section 1. Adjustably secured to the lower side of member A in any suitable manner is a pointer 5 positioned on a line disposed at right angles to double sections 1 and passing through the center index point 100 of member A.

Formed adjacent the upper and lower edges of member A, parallel with the double sections 1, are two horizontally disposed grooves 6, which receive coacting tongues 7 formed on the lower surface of a frame 8. Tongues 7 slidably engage grooves 6 in such a manner that frame 8 may be slidably moved longitudinally backwards and forwards across the surface of member A. Preferably, frame 8 comprises four frame members: an upper horizontal member 9 having in the opposite ends thereof slots 10, a lower frame member 11 provided with slots 10 in the opposite ends thereof and having formed in any suitable manner on its upper surface a scale 12 of equal parts, numbered 0-10 and divided into two hundred equal lengths. When the calculaplane is made of such size that scale 12 is approximately ten inches in length, said scale is preferably divided into five hundred equal parts. It is to be understood, however, that the number of divisions of scale 12 may be varied in accordance with the length thereof. It may be desirable to locate scale 12 on the lower portion of scale member A, or on the lower portion of scale member B, but preferably said scale is located on frame 8 as illustrated. Members 9 and 11 are preferably rigidly and adjustably connected by transverse members 13 and 14, each of which is provided with slots 10 in the opposite ends thereof. Transverse members 13 and 14 are preferably secured to the lower surface of upper and lower members 9, 11 as by means of screws 15 extending through slots 10 in such a manner that the dimensions of frame 8 may be adjusted as desired to overcome inaccuracies due to expansion or contraction of the various parts.

Each of transverse members 13 and 14 comprises upwardly and laterally extending flanges 16 as is clearly shown in Figs. 3 and 4. Adjustably secured in any suitable manner to transverse member 13, midway of the opposite ends thereof, is a pointer 17 to indicate the double section on which the center index 100 of scale A appears.

A longitudinally extending groove 18 is formed in the upper surface of each of transverse members 13 and 14 for receiving tongues 19 of a second scale member B provided with a plurality of horizontally disposed parallel scale sections 20 extending over on cycle of logarithms. The scale values assigned to distances along scale B are not proportional to the numbers shown on them but are proportional to the logarithms of those numbers as in the case of scale member A. If desired, scale sections 20 of member B may be given a different color from that employed in scale A in order to avoid any confusion between the lines of the scale sections of the two members. Preferably, scale sections 20 are formed on laterally spaced strips 21 having at the opposite end thereof reduced portions 22 for securing said strips to the outer rectangular frame portion 23 of scale B in such a manner that strips 21 may be changed or renewed if desired.

Slidably mounted adjacent the lower edge of scale B, and substantially parallel therewith, as by means of brackets 24, are a pair of rods 25 which are normally held in spaced-apart relation by means of springs 26 which abut at one end thereof against an adjacent bracket 24 and are secured at the opposite end to a collar 27 formed in any suitable manner on rods 25. The outer ends of rods 25, which may be of reduced size, normally engage openings 28 formed in the upwardly extending flange portion 16 of members 13, 14. Openings 28 are spaced apart at intervals equal to the distance between each of double sections 1 of scale member A. To facilitate locating any scale section of member B, which it is desired to place in juxtaposition with the center index scale section of scale A, openings 28 in member 13 may be numbered as illustrated in Fig 2, wherein the lower opening is numbered 1000, the one immediately above 1259, etc. These numbers, which constitute a selector scale, represent the scale value of the commencement of each scale section 20 of member B. The inner adjacent ends of rods 25 have secured thereto upwardly extending members 29 by means of which the operative may disengage the outer ends of said rods from openings 28 and slide scale member B along grooves 18 to any desired transverse position over scale A. Preferably, a pair of curved leaf springs 30 are secured to one end of scale member B as at 31, 31 in such a manner that said springs have sliding engagement with the upwardly extending flange portion 16 of transverse member 14. Springs 30 maintain scale B at all times in the same relative longitudinal position with respect to frame 8.

The location of points on scale B is assisted by means of a finder scale 32 placed transversely at right angles to scale sections 20. A scale 33 of equal parts may be provided adjacent and parallel to scale 32 for determining the logarithms of numbers, in conjunction with scale 12.

The operation of the device is as follows: Scale B may be moved horizontally to the right or left to properly position a number on said scale in the proper longitudinal position, with respect to any number on scale A by manually sliding frame 8 to the desired position, coacting grooves 6, and tongues 7, insuring that scale sections 20 of scale member B will be maintained parallel at all times to double sections 1 of scale member A. Movement of scale B transversely of scale A is effected by withdrawing rods 25 from engagement with openings 28 by pressing members 29, one toward the other, and transversely sliding scale B along grooves 18 to a point where rods 25 will engage the desired openings 28 and bring the particular scale section 20 adjacent the desired double section 1 of scale member A. These two movements may be performed simultaneously if desired.

To illustrate the operation of the calculaplane for multiplication, division, and for combined multiplication and division, the index 100 at the center of scale A is illustrated in Figs. 1, 1ª as set against a point on scale B having a value of 220.46.

*Example 1.*—(Multiplication):—

Convert 461 kilograms to pounds avoirdupois (one kilogram is equal to 2.2046 pounds). Opposite 461 on scale A will be found the answer, 1016.3 on scale B.

Rule: $\dfrac{\text{Scale B}}{\text{Scale A}} = \dfrac{\text{multiplier}}{100} = \dfrac{\text{product}}{\text{multiplicand}}$

*Example 2.*—(Division):

Convert 1575 pounds avoirdupois to kilograms (2.2046 pounds avoirdupois equals one kilogram). Opposite 1575 on scale B will be found the answer, 714.4 on scale A.

Rule: $\dfrac{\text{Scale B}}{\text{Scale A}} = \dfrac{\text{divisor}}{100} = \dfrac{\text{dividend}}{\text{quotient}}$

*Example 3.*—(Combined multiplication and division):—

Combined multiplication and division can be performed on the calculaplane with one setting as shown in the following manner:—

$$\frac{151 \times 258}{68.5} = 568.7$$

$\dfrac{\text{Scale B}}{\text{Scale A}} = \dfrac{151}{68.5}$ and read above $\dfrac{568.7}{258}$ Mere inspection of the figures involved in calculation is sufficient to arrive at the position of the decimal point, but when not readily determined in this way, it may be found by the rules which follow:—

For the purpose of illustration, the setting of the center index 100 on scale A opposite 220.46 on scale B can be used.

*Multiplication.*—If the product is read on scale B at a point which precedes the center index on scale A, the number of digits in the product will be the sum of the number of digits in the multiplier and multiplicand. If the product is read on scale B, at a point which follows the center index of scale A, the number of digits in the product will be the sum of the number of digits in the multiplier and multiplicand less one.

*Examples.*

$51 \times 22.046 = 1124.3$ $(2+2=4$ digits$)$;
$31 \times 22.046 = 683.4$ $(2+2-1=3$ digits$)$.

*Division.*—If the quotient lies on scale A at a point which precedes the center index 100 on scale A, the number of digits in the quotient will be the difference between the number of digits in the dividend and divisor. If the quotient lies on scale A at a point which follows the center index 100 of scale A, the number of digits in the quotient will be the difference between the number of digits in the dividend and divisor plus 1.

*Examples.*

$\dfrac{1125.4}{22.046} = 51.05$ $(4-2=2$ digits$)$ $\dfrac{68.8}{22.046} = 3.12$ $(2-2+1=1$ digit$)$.

A feature of the calculaplane is that by setting any point on scale B opposite the center index 100 on scale A, the values throughout the entire scale B are placed in contact with one complete cycle of logarithms of scale A, the ratio between the two scales throughout the entire length of contact being the same as the ratio set at the center index point. This feature is of importance for obtaining pro-rates, proportions, etc., and because of the complete range of readings it furnishes for one setting.

The horizontally disposed scale 12 of equal parts is used in conjunction with the vertical scale of equal parts 33 which is provided on the left-hand side of scale B, for obtaining the mantissa of the logarithm of any number up to four figures by simply moving the number on scale B, whose logarithm is to be found, to the center index 100 of scale A. The first figure of the mantissa is read on the vertical scale of equal parts, opposite the line on which the antilogarithm appears, and the remaining three figures are obtained from the lower horizontal scale of equal parts opposite pointer 5. As an example, take the setting as shown in Figs. 1, 1ᵃ to obtain the logarithm of 220.46, read .3000 on the scale of equal parts and .0434 appearing opposite pointer 5 on scale 12, the result being .3434. Having given the logarithm of any number, the anti-logarithm may be readily found by reversing this operation. By this means, a scale of equal parts is furnished, equal to the total length of scale B, the advantages of which for calculations involving roots and powers will be readily appreciated. For example, when the calculaplane is made of such size that scale 12 is approximately ten inches in length, it is possible to obtain the four figure mantissa or anti-log of any number from 1 to 9999 directly from scales 33 and 12.

Fig. 5 illustrates one manner in which the scale of equal parts may be associated with frame 8. In this figure no double sections 1 have been shown on member A, and only two scale sections 20 are shown in member B, a diagrammatic-like figure being employed in the interest of clearness. As shown, scale 12 is formed on a longitudinally extending member 34, adapted to slide on flanged portions 16 in such a manner that scale 12 may be transversely moved into computing relation with any one of scale sections 20. Rods 25 may be omitted, if desired, when scale 12 is slidably mounted in this manner. A series of numbers, formed adjacent the left hand end of sections 20 on member B, is preferably provided for use in conjunction with slidable scale 12. Since ten scale sections extending over one complete cycle of logarithms 20 are provided on member B, the sections are consecutively numbered from 0 to 9, the number opposite each section being the first digit of the mantissa part of the logarithm of any number on that section. This transversely extending series of numbers, or the transverse scale of equal parts 33 may be omitted if desired and the first digit of the mantissa may be determined by inspection.

As an example of the use of slidable scale 12, suppose it is desired to find the mantissa part of the logarithm at 660. Member 34 is slid along flange portions 16 to bring scale 12 into computing relation with the scale section on which 660 appears. The first digit of the mantissa is read opposite the left hand end of section 20 and in this instance is found to be 8. Opposite 660 on the scale of equal parts apears the value 195; the mantissa is thus found to be .8195.

The arrangement of the calculaplane makes it possible to have, in a form both compact and easy to operate, scales of unusually long lengths with correspondingly high scale values which, if arranged according to the existing types of calculating devices, would be unwieldly. The device furnishes the same reading capacity in a space approximately 20 × 10 inches equal to that of a two hundred inch, two-log cycle, rectilinear slide-rule.

The invention is capable of receiving a variety of expressions, one of which is illustrated in the accompanying drawings, but it is to be expressly understood that the drawings are for purposes of illustration only and are not designed as a definition of the limits of the invention, reference being had for this purpose to the appended claims.

What is claimed is:—

1. In a device of the character described, the combination of a flat scale member having a plurality of logarithmically divided scale sections extending over approximately four cycles of logarithms, a second scale member cooperating therewith, said last-named member having a plurality of scale sections arranged in a single plane and extending over one cycle of logarithms, and means including a scale of equal parts associated with said second scale member for finding the mantissa part of the logarithm of any number on said scale members.

2. In a device of the character described, the combination of a flat scale member having a plurality of logarithmically divided scale sections extending over approximately four cycles of logarithms, a finder scale on said member for locating numbers on said sections, a one-log scale associated with said finder scale, a frame slidably mounted on said scale member, a scale of equal parts associated with said frame, and a second scale member slidably mounted on said frame.

3. In a device of the character described, the combination of a flat scale member having a plurality of logarithmically divided scale sections extending over approximately four cycles of logarithms, a second flat scale member associated with said first-named member, a scale of equal parts associated with said flat scale members for finding the mantissa part of the logarithm of any number on either of said scale members, means whereby the second member may be moved transversely of the first member, and means whereby the same may be simultaneously moved longitudinally of said first member.

4. A device of the class described, comprising in combination, a scale member, a frame associated with said member for longitudinal, linear adjustment therewith, said frame including four frame members each having slots in the ends thereof and means engaging the sides of said slots for adjustably securing said frame members one with the other, a second scale member associated with said frame for transverse adjustment relative to the first-named scale member and resilient means positioned for engagement with said second scale member and one of said four frame members.

5. A device of the class described comprising, in combination, a scale member, a frame slidably mounted on said member having a pair of side members provided with upwardly and laterally extending flange-portions, a second scale member slidably mounted on said frame, means associated with said second scale member including a scale of equal parts for finding the mantissa part of the logarithm of any number on either of said scale members, and resilient means secured to said last-named scale member having engagement with one of said flanged portions.

6. A device of the class described comprising, in combination, a scale member having a plurality of logarithmically-divided scale sections extending over substantially four cycles of logarithms and arranged in a series of parallel lines, a second scale member having a plurality of logarithmically-divided scale sections extending over a complete cycle of logarithms in computing relation to said first member, and a scale of equal parts including a transverse portion and a longitudinally extending portion.

7. In a device of the class described, the combination of a flat scale member having a plurality of logarithmically-divided scale sections arranged in a series of parallel lines, a second adjustable scale member having a plurality of logarithmically-divided scale sections arranged in a series of parallel lines, and a scale of equal parts for obtaining the mantissa part of the logarithm of any number on said last-named member.

8. In a device of the class described, the combination of a flat scale member having a plurality of logarithmically-divided scale sections arranged in a series of parallel lines, a finder scale for locating numbers on said member, a second scale member having a plurality of logarithmically-divided scale sections arranged in a series of parallel lines, and a finder scale for locating numbers on said second-named member.

9. In a device of the class described, the combination of a flat scale member, a second flat scale member slidably mounted thereon, and means for obtaining the mantissa part of the logarithm of any number on said last-named member comprising a transverse scale and a longitudinally extending scale.

10. In a device of the class described, the combination of a scale member having a plurality of logarithmically divided scale sections extending over one cycle of logarithms, a number positioned adjacent the end of each of said sections corresponding to the first digit of the mantissa part of the logarithms of the numbers in said sections, and a scale of equal parts of a length substantially equal to that of any one of said sections associated with said member for relative movement transversely of said sections.

11. In a computing device, the combination of a scale member and means for finding the mantissa part of the logarithm of any number on said scale member including a scale of equal parts associated therewith for relative movement transversely of said member.

12. In a device of the class described, the combination of a scale member having formed thereon a plurality of logarithmically-divided scale sections extending over a complete cycle of logarithms, and a scale of equal parts equal in length to one of said sections associated therewith for obtaining a portion of the mantissa part of the logarithm of any number on said scale sections.

13. In a device of the class described, the combination of a scale member having formed thereon a logarithmically-divided scale section, and a scale of equal parts, for obtaining the mantissa part of the logarithm of any number on said section, comprising a transverse portion and a longitudinal portion.

14. In a device of the class described, the combination of a scale member having formed thereon a plurality of logarithmically-divided scale sections extending over a complete cycle of logarithms, and means movable transversely of said section for finding the mantissa part of the logarithm of any number on said sections.

15. In a device of the class described, the combination of a scale member having formed thereon a plurality of logarithmically-divided scale sections extending over a complete cycle of logarithms, and means for finding the mantissa part of the logarithm of any number on said sections comprising a scale disposed parallel to said sections, and substantially equal in length to one of said sections.

16. In a device of the class described, the combination of a scale member having formed thereon a plurality of logarithmically-divided scale sections extending over a complete cycle of logarithms, and means for finding the mantissa part of the logarithm of any number on said sections comprising a scale disposed parallel to said sections, and a scale disposed transversely of said sections.

17. In a device of the class described, the combination of a scale member having formed thereon a plurality of logarithmically-divided scale sections extending over a complete cycle of logarithms, and means for finding the mantissa part of the logarithm of any number on said sections comprising a scale of equal parts disposed parallel to said sections, and a scale of equal parts disposed transversely of said sections.

18. In a device of the class described, the combination of a scale member having formed thereon a plurality of logarithmically-divided scale sections extending over a complete cycle of logarithms, and means for finding the mantissa part of the logarithm of any number on said sections comprising a movable scale of equal parts disposed parallel to said sections, and a fixed scale disposed transversely of said sections.

19. A device of the class described, comprising, in combination, a scale member, a frame associated therewith having a pair of side members provided with openings therein, a second scale member associated with said frame, a pair of rods slidably secured to said last-named member normally engaging a pair of said openings, and a selector scale for assisting in the selection of the openings in which it is desired to engage said rods.

20. A computing device comprising, in combination, a scale member, and a finder scale for locating numbers on said scale member.

21. A computing device comprising in combination, a scale member having thereon a plurality of logarithmically-divided scale sections and a finder scale for locating numbers on said scale member.

In testimony whereof I have signed this specification.

WILLIAM S. HAIMES.